(12) United States Patent
Garceau

(10) Patent No.: US 8,608,227 B2
(45) Date of Patent: Dec. 17, 2013

(54) SLIDEOUT ROOM SUPPORT AND LEVELING DEVICE

(75) Inventor: Bernard F. Garceau, Vandalia, MI (US)

(73) Assignee: Norco Industries, Inc., Compton, CA (US)

( * ) Notice: Subject to any disclaimer, the term of this patent is extended or adjusted under 35 U.S.C. 154(b) by 636 days.

(21) Appl. No.: 12/188,260

(22) Filed: Aug. 8, 2008

(65) Prior Publication Data

US 2009/0134650 A1 May 28, 2009

Related U.S. Application Data

(60) Provisional application No. 60/955,043, filed on Aug. 10, 2007, provisional application No. 61/022,590, filed on Jan. 22, 2008.

(51) Int. Cl.
B60P 3/34 (2006.01)

(52) U.S. Cl.
USPC ............. 296/156; 296/26.01; 296/26.13; 269/254 CS

(58) Field of Classification Search
USPC ............. 296/26.01, 26.13, 156; 267/75, 267/180–182; 248/580–595, 188.2; 254/2 B, 10.5, 8 B; 269/254 CS
See application file for complete search history.

(56) References Cited

U.S. PATENT DOCUMENTS

| | | | |
|---|---|---|---|
| 1,972,415 A | 9/1934 | Anderson | |
| 2,472,686 A * | 6/1949 | Snyder | 16/44 |
| 2,738,542 A * | 3/1956 | Clark, Jr. | 16/44 |
| 2,739,833 A | 3/1956 | Schenkel | |
| 2,744,781 A | 5/1956 | Black | |
| 2,857,197 A | 11/1958 | Hogg | |
| 2,877,509 A | 3/1959 | Kibanow | |
| 2,898,143 A | 8/1959 | Ferrera | |
| 2,898,144 A | 8/1959 | Ferrera | |
| 2,902,313 A | 9/1959 | Ferrera | |
| 2,987,342 A | 6/1961 | Meaker et al. | |
| 3,341,986 A | 9/1967 | Brosig | |
| 3,692,349 A | 9/1972 | Ehrlich | |
| 3,712,005 A | 1/1973 | Eschbach et al. | |
| 4,003,316 A * | 1/1977 | Monselle | 105/167 |
| 4,103,462 A | 8/1978 | Freller | |
| 4,168,819 A * | 9/1979 | Ducrocq | 248/573 |
| 4,270,791 A | 6/1981 | Tann | |
| 5,090,749 A | 2/1992 | Lee | |
| 5,141,361 A * | 8/1992 | Fontaine | 405/106 |

(Continued)

FOREIGN PATENT DOCUMENTS

| | | |
|---|---|---|
| BE | 523151 | 10/1953 |
| CA | 2136673 | 3/1996 |
| DE | 1095137 | 12/1960 |
| GB | 882258 | 11/1961 |

*Primary Examiner* — Dennis Pedder
(74) *Attorney, Agent, or Firm* — Hahn, Loeser & Parks, LLP

(57) ABSTRACT

A slideout room leveling device for supporting and leveling a slideout room floor of a recreation vehicle. The device may have a base mounted to a threshold of the trailer frame and a support arm that has a friction reducing member mounted to the support arm. A spring member may be mounted on the base to assist in supporting and leveling the slideout room floor. The support arm of the slideout room supporting and leveling device may remain in continuous contact with the floor of a slideout room during extension and retraction in order to support and level the slideout room.

16 Claims, 4 Drawing Sheets

(56) References Cited

U.S. PATENT DOCUMENTS

| | | | |
|---|---|---|---|
| 5,237,782 A | 8/1993 | Cooper | |
| 5,248,180 A | 9/1993 | Hussaini | |
| 5,295,430 A | 3/1994 | Dewald, Jr. et al. | |
| 5,332,276 A | 7/1994 | Blodgett, Jr. | |
| 5,348,330 A | 9/1994 | Few et al. | |
| 5,394,589 A * | 3/1995 | Braeger et al. | 16/44 |
| 5,501,428 A | 3/1996 | Garceau | |
| 5,577,351 A | 11/1996 | Dewald, Jr. | |
| 5,634,683 A | 6/1997 | Young | |
| 5,758,918 A | 6/1998 | Schneider et al. | |
| 5,788,306 A | 8/1998 | DiBiagio | |
| 5,791,715 A | 8/1998 | Nebel | |
| 5,800,002 A | 9/1998 | Tiedge et al. | |
| 5,833,296 A | 11/1998 | Schneider | |
| 5,857,733 A | 1/1999 | Dewald, Jr. et al. | |
| 5,860,693 A | 1/1999 | Ehrlich | |
| 5,901,980 A | 5/1999 | Few et al. | |
| 6,067,756 A | 5/2000 | Freirchs et al. | |
| 6,068,251 A * | 5/2000 | Baumann et al. | 267/182 |
| 6,108,983 A | 8/2000 | Dewald, Jr. | |
| 6,116,671 A | 9/2000 | Schneider | |
| 6,152,520 A | 11/2000 | Gardner | |
| 6,202,362 B1 | 3/2001 | McManus et al. | |
| 6,266,931 B1 | 7/2001 | Erickson | |
| 6,293,611 B1 | 9/2001 | Schneider et al. | |
| 6,345,855 B2 | 2/2002 | Hanser et al. | |
| 6,393,769 B1 | 5/2002 | Mertik et al. | |
| 6,409,196 B1 * | 6/2002 | McFarland | 280/250.1 |
| 6,497,449 B2 | 12/2002 | Graf et al. | |
| 6,502,893 B1 | 1/2003 | Corliss, Jr. | |
| 6,527,324 B2 | 3/2003 | McManus et al. | |
| 6,536,821 B1 | 3/2003 | Gardner | |
| 6,536,823 B2 | 3/2003 | McManus | |
| 6,561,570 B2 | 5/2003 | Gehman et al. | |
| 6,572,170 B2 | 6/2003 | McManus et al. | |
| 6,592,163 B1 | 7/2003 | Nebel | |
| 6,619,714 B2 | 9/2003 | Schneider et al. | |
| 6,623,066 B2 | 9/2003 | Garceau | |
| 6,644,719 B2 | 11/2003 | Young, Sr. | |
| 6,655,723 B2 | 12/2003 | Meijer et al. | |
| 6,729,669 B2 | 5/2004 | McManus et al. | |
| 6,783,164 B2 | 8/2004 | Bortell | |
| 6,802,555 B2 * | 10/2004 | Yoder et al. | 296/165 |
| 6,854,787 B2 | 2/2005 | Gehman et al. | |
| 6,868,638 B1 | 3/2005 | Gardner | |
| 6,928,773 B1 | 8/2005 | Gardner | |
| 7,011,351 B1 | 3/2006 | Crean | |
| 7,040,689 B2 | 5/2006 | Few et al. | |
| 7,066,517 B1 | 6/2006 | Crean | |
| 7,066,528 B1 | 6/2006 | Crean | |
| 7,108,005 B1 | 9/2006 | Christenson et al. | |
| 7,150,482 B1 | 12/2006 | Blodgett, Jr. | |
| 7,210,269 B2 | 5/2007 | Garceau et al. | |
| 2001/0008059 A1 | 7/2001 | McManus et al. | |
| 2002/0023393 A1 | 2/2002 | McManus | |
| 2002/0063441 A1 | 5/2002 | Young, Sr. | |
| 2002/0074816 A1 | 6/2002 | McManus et al. | |
| 2002/0089212 A1 | 7/2002 | Garceau et al. | |
| 2003/0205911 A1 | 11/2003 | Schneider | |
| 2004/0094983 A1 | 5/2004 | Bortell | |
| 2004/0145204 A1 | 7/2004 | Few et al. | |
| 2005/0179278 A1 | 8/2005 | Yoder | |
| 2005/0230989 A1 | 10/2005 | Nebel | |
| 2005/0285090 A1 | 12/2005 | Garceau et al. | |
| 2006/0186683 A1 | 8/2006 | Garceau et al. | |
| 2007/0194586 A1 | 8/2007 | Gardner | |
| 2007/0216183 A1 | 9/2007 | Few et al. | |

* cited by examiner

SLIDEOUT ROOM SUPPORT AND LEVELING DEVICE

BACKGROUND AND SUMMARY

This application claims priority to U.S. Provisional Ser. No. 60/955,043 filed on Aug. 10, 2007 and U.S. Provisional Ser. No. 61/022,590 filed on Jan. 22, 2008, the disclosures of which are hereby incorporated by reference in their entirety.

The present disclosure relates generally to a support system for trailers and motor vehicles, including without limitation recreational vehicles, utility trailers, and the like (hereinafter collectively "trailers") that have a slideout room. More specifically, the present invention relates to a device for supporting and leveling the frame of the slideout room.

Recreation vehicles ("RV's") may be used for vacationing and traveling as a substitute for living quarters. Certain recreation vehicles including motor homes, fifth wheel trailers and travel trailers may be provided with an extendable slideout unit for increasing the vehicle's living space. The slideout rooms may be retracted into the travel vehicle during transport and may be extended from the travel vehicle during use to increase the square footage of the RV. This slideout unit may be extended for use when the RV is parked and is retracted when the RV is to be moved.

Presently disclosed is a device for leveling the floor of a slideout room with the floor of a recreation vehicle. The support mechanism for supporting and leveling a slideout room of a recreation vehicle comprises a base operably mounted to a threshold, the base having an inboard end and an outboard end, a support arm having an inboard end and an outboard end; wherein the base and the support arm are cooperatively associated through a pivotable axis at the inboard end of the base and the inboard end of the support arm, and a spring member operably mounted to the base.

Presently disclosed is also a method of supporting and leveling a slideout room floor, comprising the steps of providing a slideout room leveling device comprising a base having an inboard end and an outboard end, and a support arm having an inboard end and an outboard end; wherein the base and the support arm are cooperatively associated through a pivotable axis at the inboard end of the base and the inboard end of the support arm, and a spring member operably mounted to the base, and a friction-reducing member operably mounted to the outboard end of the support arm, and mounting the base of one or more of the slideout room leveling devices to a threshold of the slideout room. The method further comprises extending the slideout room floor from an associated recreation vehicle while the slideout room floor maintains contact with the support arm; and pivoting the support arm about the pivotable axis at the inboard end of the support arm while the slideout room floor maintains contact with the outboard end of the support arm, retracting the slideout room floor from the associated recreation vehicle while the slideout room floor maintains contact with the support arm, and pivoting the support arm about the pivotable axis at the inboard end of the support arm while the slideout room floor maintains contact with the outboard end of the support arm.

The foregoing and other aspects will become apparent from the following detailed description when considered in conjunction with the accompanying drawing figures.

DETAILED DESCRIPTION OF THE DRAWINGS

Figure 1:
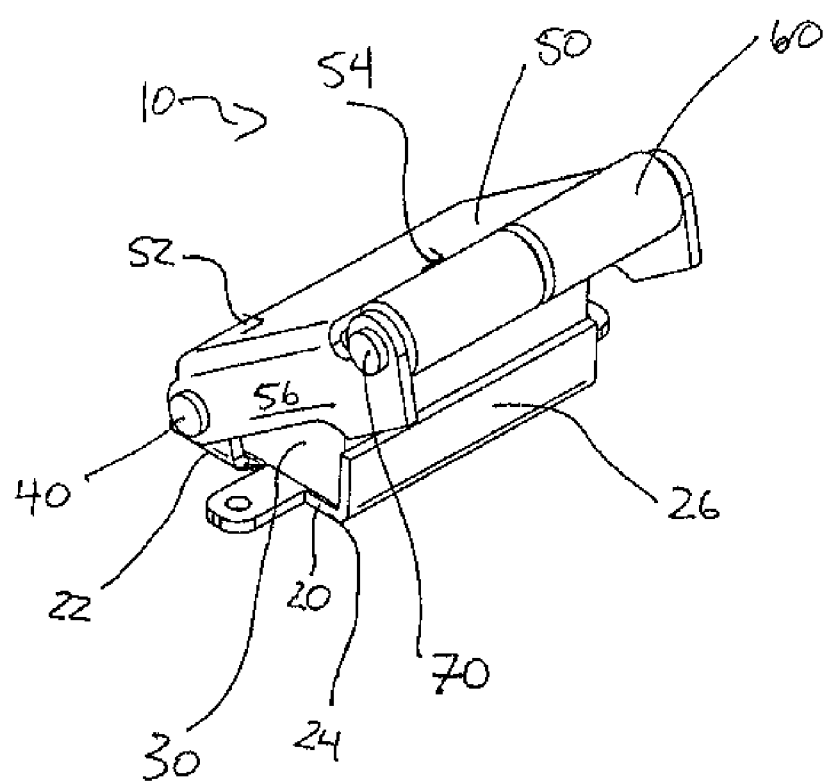
FIG. 1 shows a perspective view of the slideout room support and leveling device.

As shown in FIG. 1, the slideout room supporting and leveling device 10 comprises a base 20 that may be operably mounted to a trailer threshold, a spring member 30, a pivotable axis 40, a support arm 50, a friction-reducing member 60, and a rotatable axis 70, as shown in FIG. 1. The base 20 comprises an inboard end 22, an outboard end 24, and a perpendicular tab 26 located at the outboard end 24. The support arm 50 comprises an inboard end 52, an outboard end 54, and a pair of sidewalls 56.

In an alternate embodiment, the base 20 may be the trailer threshold instead of a separate assembly. In this alternative arrangement, the slideout room leveling device may be assembled by directly mounting the support arm and spring member to the threshold instead of to a base.

Figure 2:
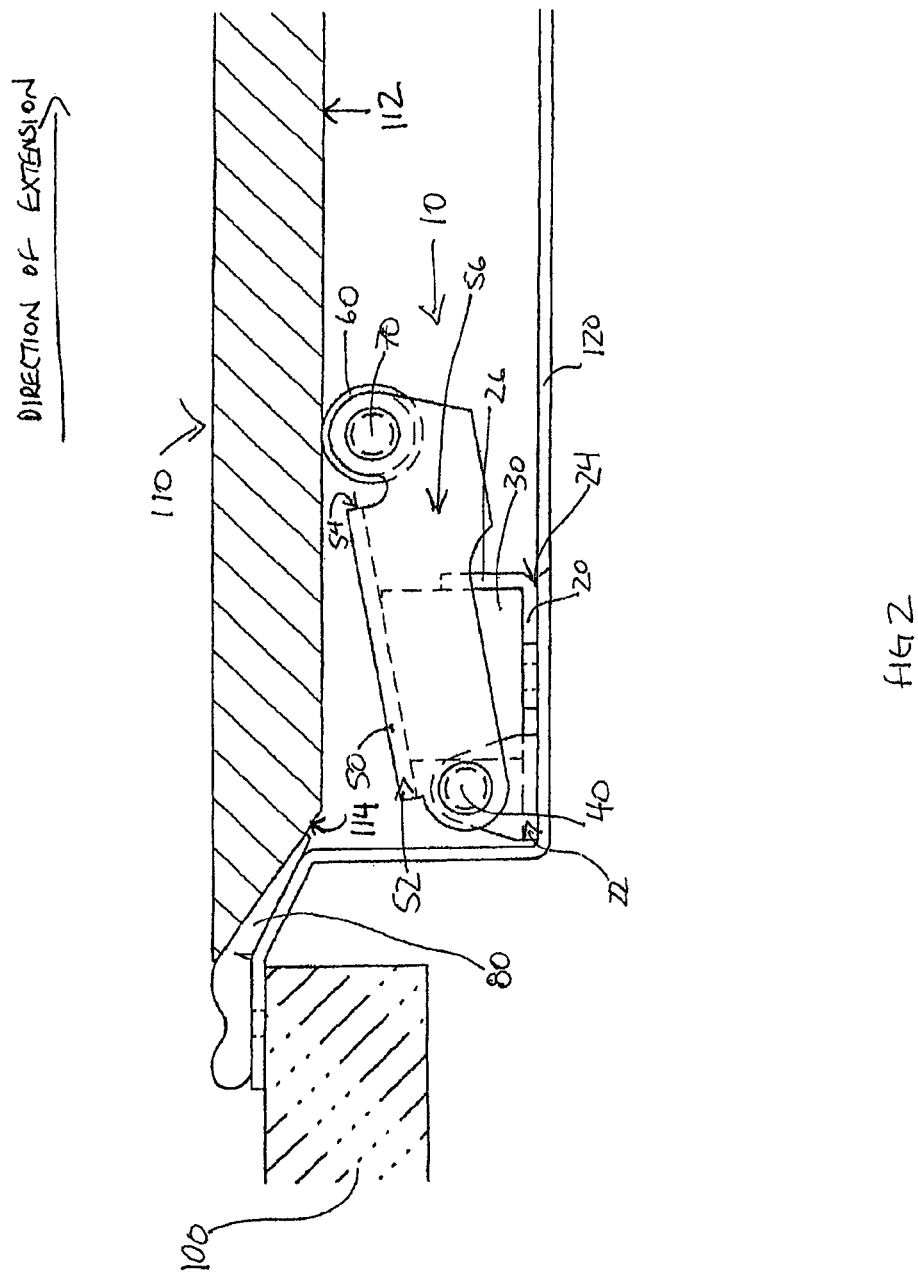
FIG. 2 shows a side view of the slideout room support and leveling device with the slideout room partially extended.
Figure 3:
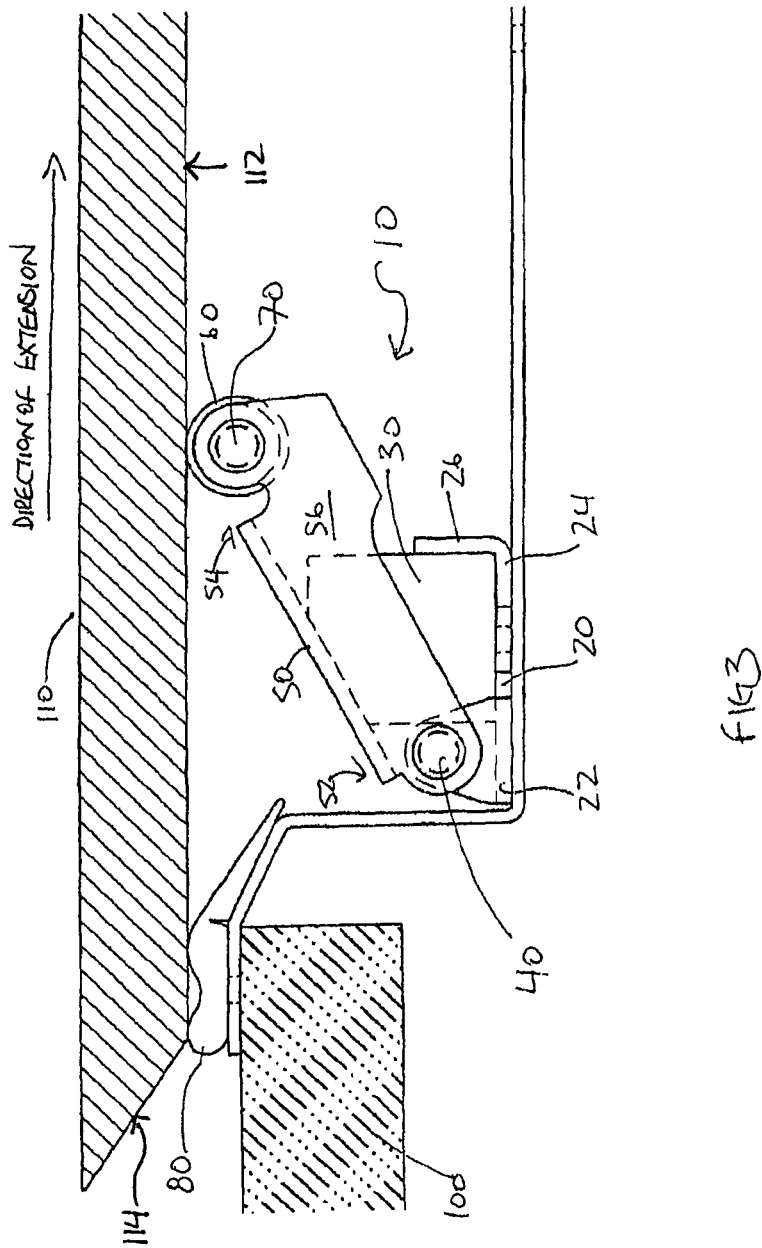
FIG. 3 shows a side view of the slideout room support and leveling device with the slideout room partially retracted into the body of the recreational vehicle.
Figure 4:
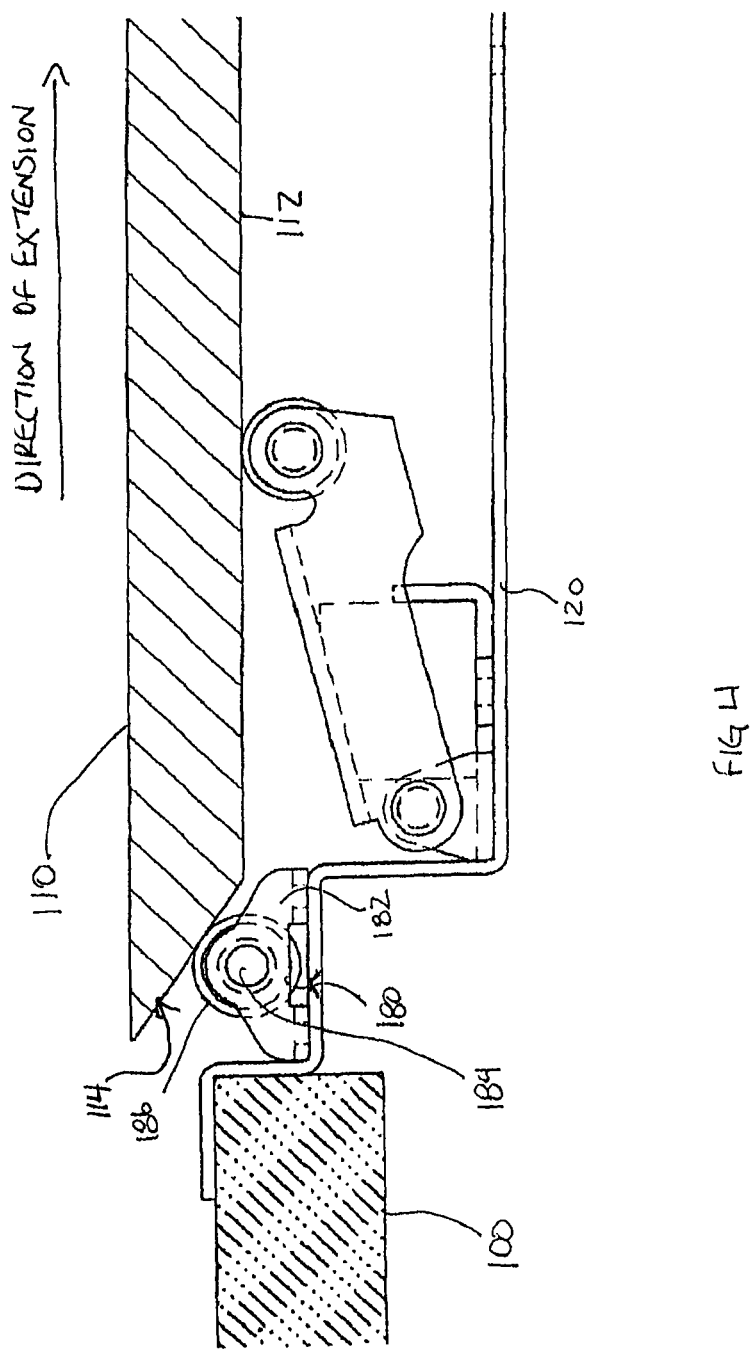
FIG. 4 shows a side view of an alternate embodiment of the slideout room support and leveling device with the slideout room partially extended.

In construction, the base 20 is mounted to the threshold 120 of a recreation vehicle containing a slideout room 110 at a position below the floor of the slideout room, as shown in FIGS. 2 through 4. The inboard end 22 of the base 20 is connected to the inboard end 52 of the support arm 50 by a pivotable axis 40, which permits the support arm 50 to pivot about the axis 40 while the base 20 remains static.

Referring again to FIG. 1, the spring member 30 may be placed in the area defined by the upper surface of the base 20 and the perpendicular tab 26, and may comprise an elongated trapezoid. The spring member may be in the form of either a coil spring or an elastomeric wedge. When the spring member is an elastomeric wedge, the spring member may be constructed from materials such as, but not limited to, rubber or other elastomeric polymers.

A friction-reducing member 60 may be operably connected to the outboard end 54 of the support arm 50, between the pair of sidewalls 56. The friction-reducing member 60 may be constructed from a roller as shown in FIG. 1. When the friction-reducing member is a roller, the roller may be operably connected to the support arm through a rotatable axis. In an alternate embodiment, a friction reducing means other than a roller may be employed at the outboard end 54 of the support arm. In this alternative, the friction-reducing member may be constructed from bearings such as a rolling-element bearing including, but not limited to a ball bearing or a roller bearing. The friction-reducing member may comprise one bearing or more than one bearing that may be placed in series and operably connected to the support arm.

In operation, the slideout room 110 may be extended outwardly by a drive system from the wall or floor of the recreation vehicle 100. As the slideout room 110 extends from the vehicle, the room 110 moves outwardly with the friction-reducing member 60 maintaining continuous contact with the horizontal lower surface 112 of the room 110. As the room 110 continues to extend from the vehicle, the weight of the room 110 causes the support arm 50 to pivot downwardly, thereby compressing the spring member 30 until either the spring member 30 cannot be compressed further by the weight of the slideout room or the lower surface of the support arm 50 contacts the perpendicular tab 26, at which point support arm 50 cannot pivot any further. At this point, the compressed spring member 30 acts a storehouse of potential energy to be released upon decompression. The slideout 110 room may continue to extend outwardly until the angled lower surface 114 of the room 110 contacts either the threshold 120 or alternatively a sealing member 80 mounted to the threshold 120, at which point the slideout room 110 continues to extend outwardly and slides downwardly until the floor of the slideout room 110 is essentially level with the floor of the recreation vehicle 100, that is, the floor of the slideout room 110 is horizontally coplanar with the floor of the recreation vehicle 100.

When retracting the slideout room 110 into the travel vehicle, the opposite sequence of events occurs. As the room 110 is retracted by the drive system, the room 110 must move inwardly and upwardly to be secured within the travel vehicle. As the room 110 is retracted, the spring member 30 expands or is decompressed, thereby releasing its stored kinetic energy while lifting the majority of weight of the room 110. As the room 110 is retracted, the increase in weight supported by the travel vehicle allows the spring member 30 to continue to expand, causing the support arm 50 and friction-reducing member 60 to pivot away from the base 20. Throughout both extension and retraction of the slideout room 110, the friction-reducing member 60 maintains continuous contact with the horizontal lower surface 112 of the room 110 and supports the majority of the weight of the slideout room 110. The continuous contact between the device and surface of the slideout room may increase the smoothness of the movement of the slideout room 110 during extension and retraction as compared to the jerkiness of previous slideout room extension/retraction devices.

The supporting and leveling device 10 may be customized to adapt to the parameters of a variety of travel vehicle and slideout room sizes and weights, and is not limited to any certain dimensions. For example, the width of the base 20 may be extended further in the outboard direction to permit a wider spring member 30. This wider spring member 30 may be utilized when expanding and/or retracting larger or heavier slideout rooms. In one embodiment, the spring member 30 may comprise rubber of varying durometer depending upon the size and weight of the slideout room. For example, a higher durometer rubber may be utilized in the instance of a heavier slideout room, while a lower durometer rubber may be utilized in the instance of a lighter slideout room.

In an alternative embodiment, the friction-reducing member 60 may comprise a plurality of rollers located at a plurality of locations in the support arm 50, provided that the outer surface of the friction-reducing member 60 extends beyond the top surface of the support arm 50. It is also contemplated that a plurality of spaced apart leveling devices 10 may be employed across the width of a slideout room 110 when leveling a relatively heavier slideout room, whereas a single leveling device 10 may be sufficient for leveling a relatively lighter slideout room.

As shown in FIGS. 2 and 3, a sealing member 80 may comprise a low friction material, including without limitation plastic materials such as polyethylene. The sealing member may be operably mounted to the threshold 120 of the slideout room and extend across the width of the slideout room opening. In operation, the sealing member 80 may reduce friction between the lower surface of the slideout room 110 and the threshold 120 as the slideout room 110 is extended and retracted from the travel vehicle. Furthermore, as the sealing member 80 extends across the width of the slideout room opening, the sealing member 80 may reduce the amount of ambient air entering the travel vehicle. Such a sealing member 80 may prevent warm outside air (during the summer and other warm times of year) and cold outside air (during the winter and other cold times of year) from entering the climate controlled travel vehicle. The sealing member may reduce the amount of energy used to control the climate of the travel vehicle.

Alternately, or in addition, the sealing member 80 may be a rolling member similar to the roller on the outboard end of the support arm 50. The roller may have a pivotable axis about which the roller can rotate in order to smoothly transition the slideout room floor during the extension and retraction operation. The roller may also be constructed from a rolling element type bearing, such as a ball bearing.

As shown in FIG. 4, a slideout room leveling device 10 may be employed in combination with a threshold having a modified profile 120', wherein a support roller mechanism 180 is coupled to the threshold 120'. The support roller mechanism 180 comprises a pair of brackets 182 which are fastened to the threshold 120', and a roller 186 which is rotatably connected between the brackets 182 by a rotatable axis 184. When extending the slideout room 110 from the travel vehicle, the surface of the roller 186 contacts the lower surface of the slideout room 110 and the roller 186 rotates about rotatable axis 184 as the room continues to extend from the travel vehicle. When retracting the slideout room 110 into the travel vehicle, the roller 186 is maintained in contact with the lower surface of the slideout room floor 110 and functions as a pivot point for the slideout room 110 as the room moves inwardly and upwardly. The roller 186 serves to prevent contact between the lower surface of the slideout room 110 and the frame 120, therein reducing wear on both surfaces while simultaneously reducing the force used in extending the slideout room 110 from and retracting the slideout room 110 into the travel vehicle.

A single support roller mechanism 180 or a plurality of spaced apart roller mechanisms 180 may be employed across the width of the slideout room opening, depending upon the weight of the slideout room 110. The support roller mechanism 180 may be as wide as the width of the slideout room opening.

The foregoing description of the slideout room support and leveling device is by way of example only, and other variations of the above described device are provided by the present device. The embodiments presented herein have been presented for purposes of illustration and are not intended to be exhaustive or limiting. Many variations and modifications are possible in light of the foregoing teaching.

What is claimed is:

1. A support mechanism for supporting and leveling a slideout room of a recreation vehicle comprising:
   a base mounted to a threshold of a recreational vehicle, the threshold recessed from a floor of the recreational vehicle, the base having an inboard end toward the interior of the recreational vehicle and an outboard end toward the exterior of the recreational vehicle,
   a support arm having an inboard end and an outboard end with a pair of side walls extending therebetween;
   a friction reducing member operably mounted to the outboard end of the support arm between the pair of sidewalls, the friction reducing member in contact with a horizontal lower surface of a slideout room associated with the recreational vehicle;
   wherein the base and the support arm are cooperatively associated through a pivotable axis at the inboard end of the base and the inboard end of the support arm, and
   a spring member operably mounted between the base and the support arm and placed in an area at least partially defined by an upper surface of the base and a lower surface of the support arm and the pair of side walls of the support arm.

2. The support mechanism according to claim 1, wherein the friction reducing member is at least one roller.

3. The support mechanism according to claim 1, wherein the friction reducing member is one or more bearings.

4. The support mechanism according to claim 1, further comprising a perpendicular tab operably mounted to the outboard end of the base.

5. The support mechanism according to claim 1, wherein the support arm further comprises a top plate having a generally flat surface extending between the pair of sidewalls.

6. The support mechanism according to claim 1, wherein the spring member is an elastomeric wedge.

7. The support mechanism according to claim 1, further comprising a sealing member operably connected to a threshold of the slideout room.

8. The support mechanism according to claim 7, wherein the sealing member is constructed from a low friction plastic.

9. A support mechanism for supporting and leveling a slideout room of a recreation vehicle comprising:
   a base operably mounted to a threshold of a recreational vehicle, the threshold recessed from a floor of the recreational vehicle, the base having an inboard end toward the interior of the recreational vehicle and an outboard end toward the exterior of the recreational vehicle,
   a support arm having an inboard end and an outboard end with a pair of side walls extending therebetween;
   a friction reducing member operably mounted to the outboard end of the support arm between the pair of side walls, the friction reducing member in contact with a horizontal lower surface of a slideout room associated with the recreational vehicle;
   wherein the base and the support arm are cooperatively associated through a pivotable axis at the inboard end of the base and the inboard end of the support arm;
   a spring member operably mounted between the base and the support arm and placed in an area at least partially defined by the pair of side walls of the support arm, and
   a rolling member operably mounted to the threshold.

10. The support mechanism according to claim 9, wherein the friction reducing member comprises a plurality of rollers.

11. A method of supporting and leveling a slideout room, comprising the steps of:
   providing at least one slideout room supporting and leveling device comprising a base mounted to the threshold of a recreational vehicle, the threshold recessed from a floor of the recreational vehicle, the base having an inboard end toward the interior of the recreational vehicle and an outboard end toward the exterior of the recreational vehicle, and a support arm having an inboard end and an outboard end with a pair of side walls extending therebetween; a friction reducing member operably mounted to the outboard end of the support arm between the pair of sidewalls, the friction reducing member in contact with a horizontal lower surface of a slideout room associated with the recreational vehicle; wherein the base and the support arm are cooperatively associated through a pivotable axis at the inboard end of the base and the inboard end of the support arm, a spring member operably mounted between the base and the support arm and placed in an area at least partially defined by an upper surface of the base and the pair of side walls of the support arm.

12. The method of claim 11, further comprising the steps of:
   extending a slideout room floor from an associated recreation vehicle while the slideout room floor maintains contact with the support arm; and
   pivoting the support arm about the pivotable axis at the inboard end of the support arm while the slideout room floor maintains contact with the outboard end of the support arm.

13. The method of claim 11, further comprising the steps of:
   retracting a slideout room floor from the associated recreation vehicle while the slideout room floor maintains contact with the support arm, and
   pivoting the support arm about the pivotable axis at the inboard end of the support arm while the slideout room floor maintains contact with the outboard end of the support arm.

14. The method of claim 11, further comprising the steps of:
   compressing the spring member as the slideout room floor is extended, and
   decompressing the spring member as the slideout room floor is retracted.

15. The method of claim 11, wherein the slideout room floor is in continuous contact with the friction-reducing member that is operably mounted to the outboard end of the support arm as the slideout room floor extends and retracts from the recreation vehicle.

16. The method of claim 11, further comprising the step of sealing an area between the threshold and slideout room floor, wherein the slideout room floor contacts a sealing member that is operably mounted to the threshold as the slideout room floor extends and retracts from the recreation vehicle.

* * * * *

UNITED STATES PATENT AND TRADEMARK OFFICE
CERTIFICATE OF CORRECTION

| | | |
|---|---|---|
| PATENT NO. | : 8,608,227 B2 | Page 1 of 1 |
| APPLICATION NO. | : 12/188260 | |
| DATED | : December 17, 2013 | |
| INVENTOR(S) | : Bernard F. Garceau | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 762 days.

Signed and Sealed this
Twenty-fifth Day of August, 2015

Michelle K. Lee
*Director of the United States Patent and Trademark Office*